United States Patent
Daleiden et al.

[11] Patent Number: 5,120,248
[45] Date of Patent: Jun. 9, 1992

[54] CAM-TYPE LATCHING MECHANISM FOR SECURING COWL SECTIONS TOGETHER

[75] Inventors: James G. Daleiden, Fond du Lac; George D. Idzikowski, Oshkosh, both of Wis.

[73] Assignee: Brunswick Corporation, Skokie, Ill.

[21] Appl. No.: 636,486

[22] Filed: Dec. 31, 1990

[51] Int. Cl.$^5$ .......................................... B63H 21/24
[52] U.S. Cl. ................................. 440/77; 440/900; 292/202; 292/DIG. 55
[58] Field of Search ............. 292/202, 204, 240, 241, 292/DIG. 39, DIG. 40, DIG. 55, 193; 123/195 P; 440/900, 77, 76

[56] References Cited

U.S. PATENT DOCUMENTS

| | | | |
|---|---|---|---|
| 4,073,524 | 2/1978 | Gianessi | 292/193 |
| 4,844,031 | 7/1989 | Boda et al. | 123/195 P |
| 4,871,333 | 10/1989 | Curtis et al. | 440/77 |
| 4,875,883 | 10/1989 | Slattery | 440/77 |
| 4,915,428 | 4/1990 | Hayakawa | 292/DIG. 55 |
| 4,927,194 | 5/1990 | Wagner | 292/128 |
| 4,932,909 | 6/1990 | Curtis et al. | 440/77 |
| 4,971,587 | 11/1990 | Uchida et al. | 440/77 |
| 5,018,998 | 5/1991 | Kato | 440/77 |

Primary Examiner—Edwin L. Swinehart
Attorney, Agent, or Firm—Andrus, Sceales, Starke & Sawall

[57] ABSTRACT

A latch system for securing upper and lower cowl sections of an outboard motor. The latch system comprises a catch assembly located at one end of the cowl assembly, and a latch mechanism located at the other end of the assembly. The catch assembly includes a catch block mounted to one of the cowl sections, with a catch slot formed in the catch block. A roller member is mounted to the other of the cowl sections, for engaging the catch slot. The catch slot is formed so as to provide an end wall against which the roller is maintained when the cowl sections are secured together, with the material of the catch block engaging the roller member to prevent relative vertical movement between the cowl sections. A cam block is located at the same end of the cowl assembly as the latch mechanism, and is mounted to one of the cowl sections. A cam follower is mounted to the other of the cowl sections, and engages a cam surface formed on the cam block for facilitating movement of the roller member into the catch slot. A stationary latch member is engageable by a movable latch member in response to movement of a latch handle, to maintain the cam follower within the cam slot, and thereby to maintain the catch rollers within the catch slots. Relative vertical and horizontal movement between the cowl sections is thus prevented.

25 Claims, 3 Drawing Sheets

5,120,248

CAM-TYPE LATCHING MECHANISM FOR SECURING COWL SECTIONS TOGETHER

BACKGROUND AND SUMMARY

This invention relates to an outboard marine propulsion system in which a powerhead is enclosed by upper and lower cowl sections, and more particularly to a latching system for securing the upper and lower cowl sections together.

Various latching systems are known for securing upper and lower cowl sections of an outboard motor together. Many latching systems provide a hook-and-catch arrangement at one end of the cowl assembly and a manually operable latching mechanism at the other end. In the hook and catch arrangement, the catch typically protrudes from an exterior surface of the lower cowl section. The hook is connected to the upper cowl section so as to engage the catch, thereby fixing the position of the cowl sections relative to each other adjacent one end of the cowl assembly. The latch assembly typically comprises a manually operable external latch handle which is pivotably mounted to the lower cowl section, and an internal latching mechanism interconnected with the latch handle so as to be movable between a locking position and a release position in response to pivoting movement of the latch handle. A catch member is mounted to the interior of the upper cowl section, and is engageable by the latching mechanism upon movement to its locking position so as to secure the cowl sections together.

A recognized problem in securing upper and lower cowl sections together is that of ensuring that the latch assembly remains in its locking position upon sudden forces experienced by the outboard motor during operation. Such forces can occur when the lower unit of the outboard motor strikes a submerged object, such as a log or rock, during operation. A compressible seal is typically disposed at the joint between the upper and lower cowl sections and, when a sudden force is experienced, the seal may compress and result in the latch assembly disengaging the catch member and the latch assembly moving to its release position. When this occurs, the upper cowl section may become disengaged from the lower cowl section.

It is an object of the present invention to provide a mechanism for securing upper and lower cowl sections together, which is capable of maintaining the cowl sections in engagement with each other when the cowl assembly experiences a sudden force resulting from the outboard motor striking a submerged object. It is a further object of the invention to provide a latching mechanism which is simple in its construction and operation, yet which provides secure engagement of the cowl sections together. It is a further object of the invention to provide a latching mechanism which facilitates movement of the cowl sections together, providing a smooth and fluid motion during assembly of the cowl sections.

In accordance with the invention, a latching mechanism for securing upper and lower cowl sections of an outboard motor together comprises a catch system interposed between the cowl sections adjacent one end of the cowl assembly, and including a catch slot associated with one of the cowl sections and a retainer member associated with the other of the cowl sections. The retainer member is engageable within the catch slot, and is adapted to be positioned against an end wall of the slot when the cowl sections are secured together. When the retainer member is engaged with the end wall of the catch slot, relative vertical movement between the cowl sections is prevented at one end of the cowl assembly. A latch system is interposed between the cowl sections adjacent the other end of the cowl assembly, and is movable between a locking position and a release position. The latch system in its locking position maintains the retainer member against the end wall of the catch slot, and prevents relative vertical and horizontal movement between the cowl sections at the other end of the cowl assembly.

In a preferred embodiment, the catch slot is formed in a stationary catch block mounted to one of the cowl sections and located within the interior of the cowl assembly. The retainer member is preferably in the form of a roller member mounted to the other of the cowl sections, and adapted for placement into engagement with the catch slot formed in the catch block. The catch block and the latch assembly are located adjacent opposite ends of the cowl assembly. In a preferred embodiment, a pair of catch blocks are mounted one on either side of one of the cowl sections, and a pair of retainer members are mounted to the other of the cowl sections for engagement with the catch slots formed in the pair of catch blocks.

Each catch slot is formed so as to provide an entrance for receiving the retainer member upon vertical movement of the upper cowl section toward the lower cowl section, and preferably includes a substantially horizontal portion adjacent the slot end wall. With this arrangement, the material of the catch block is located in vertical alignment with the retainer member when the retainer member is engaged with the end wall of the slot, to prevent relative vertical movement between the cowl sections.

A cam block is preferably mounted to one of the cowl sections at the end of the cowl assembly opposite the catch blocks and retainer members, and is located adjacent the latch mechanism. The cam block has a cam surface formed thereon, and a cam follower is mounted to the other of the cowl sections for engaging the cam surface. Movement of the cam follower along the cam surface as the cowl sections are moved together provides relative horizontal movement between the cowl sections, to draw the retainer members horizontally within the catch slots and into engagement with the end walls of the catch slots.

The latch mechanism preferably comprises a pivotable manually operable latch handle mounted to one of the cowl sections, a latch member mounted to the latch handle and pivotably movable therewith, and a horizontally oriented stationary latch member mounted to the other of the cowl sections for engagement by the movable latch member. The latch handle and movable latch member are pivotable about a vertical pivot axis. With this arrangement, a sudden force resulting from the lower unit striking a submerged object does not cause the latch handle and movable latch member to be moved from the locking position.

A vertical recess is provided in one of the cowl sections, and a mating vertical projection is provided in the other of the cowl sections, adjacent the end of the cowl assembly to which the latch assembly is mounted. The vertical projection engages the recess when the upper cowl section is lowered onto the lower cowl section.

With this arrangement, proper lateral positioning of the cowl sections relative to each other is insured.

Various other objects, features and advantages of the invention will be made apparent upon consideration of the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
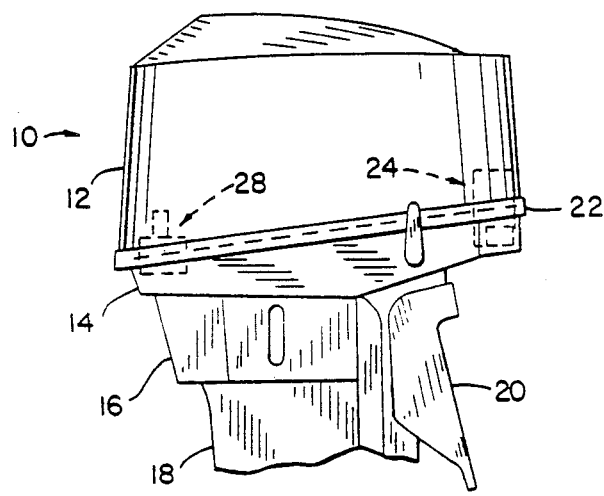
FIG. 1 is a partial side elevation view of an outboard marine motor incorporating the latching mechanism of the invention.

Referring to FIG. 1, a marine outboard motor 10 includes a powerhead (not shown) housed within the interior of a cowl assembly consisting of an upper cowl section 12 and a lower cowl section 14, all as is known. A trim cover 16 is mounted to lower cowl section 14. A drive shaft housing 18 extends downwardly from the powerhead, and houses a rotating drive shaft for transmitting rotary power from the powerhead to the outboard motor lower unit (not shown). A transom mounting bracket 20 is connected to drive shaft housing 18 for securing outboard motor 10 to the transom of a boat.

A compressible sealing strip 22 is located at the joint between upper cowl section 12 and lower cowl section 14.

Figure 2:
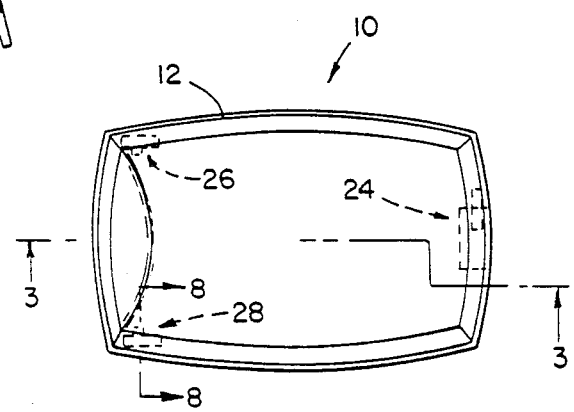
FIG. 2 is a partial top plan view of the cowl assembly of the outboard motor of FIG. 1.
Figure 3:
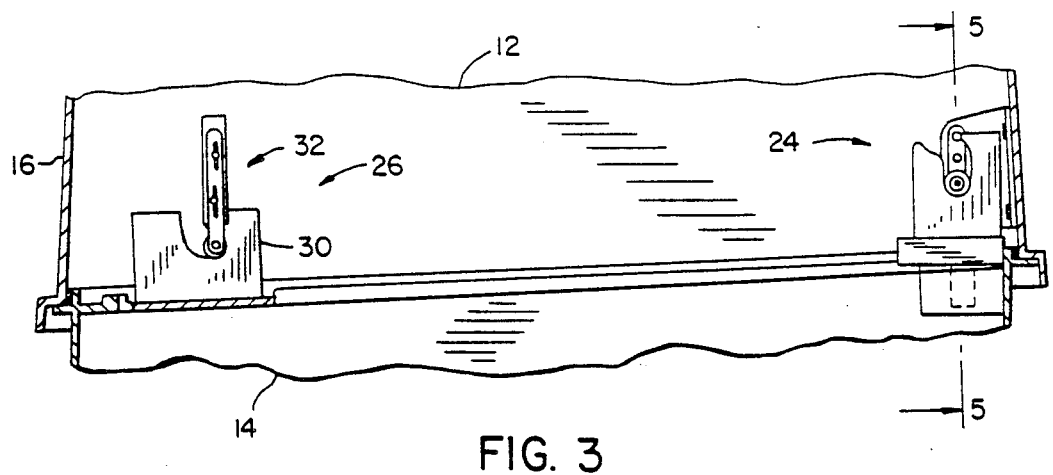
FIG. 3 is a partial sectional view taken along line 3—3 of FIG. 2.

As shown in FIGS. 1, 2 and 3, a latch mechanism 24 is provided at the front end of the cowl assembly and located within the cowl assembly interior. A pair of rear catch assemblies 26, 28 are located within the interior of the cowl assembly adjacent the cowl assembly rear end.

Catch assemblies 26 and 28 are identical in construction and operation. Referring to FIG. 3, catch assembly 26 generally includes a catch block 30 mounted to lower cowl section 14, and a retainer assembly 32 mounted to the inner wall of upper cowl section 16.

Figure 7:
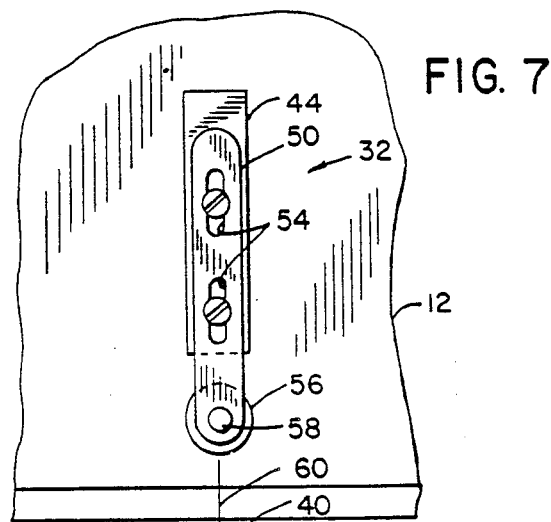
FIG. 7 is a partial side elevation view showing a catch block mounted to the lower cowl section, and a roller member mounted to the upper cowl section, prior to lowering of the upper cowl section onto the lower cowl section.
Figure 8:
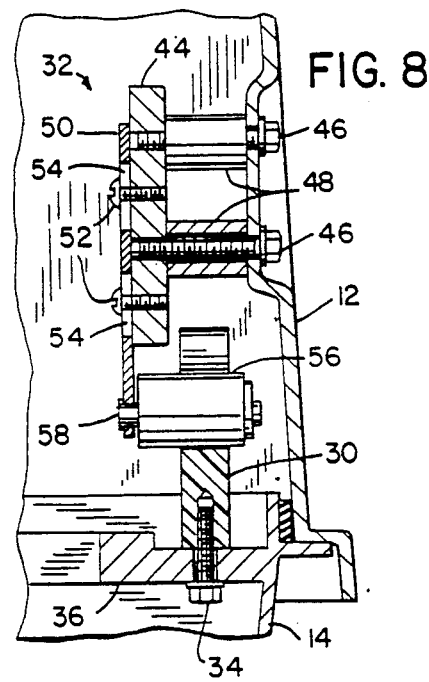
FIG. 8 is an end elevation view, partially in section, showing the catch block with the roller member located within the catch slot and engaging its end wall.

FIGS. 7 and 8 illustrate catch assembly 26 in greater detail. As shown, catch block 30 is mounted to lower cowl section 14 by means of a pair of screws 34 extending through openings formed in a horizontal lip 36 provided on lower cowl section 14, which extend inwardly from the inner wall thereof. Catch block 30 is preferably formed of a nylon material. A catch slot 38 is formed in catch block 30, and includes a rear curved wall 39 and an upwardly facing entrance 40 which leads to a substantially vertical portion of slot 38. From the vertical portion adjacent entrance 40, catch slot 38 curves forwardly and provides a substantially horizontal portion, terminating in a rearwardly facing end wall 42.

Referring again to FIGS. 7 and 8, retainer assembly 32 comprises a block 44 mounted to the side wall of upper cowl section 12 by means of a pair of screws 46 extending through openings formed in upper cowl section 12 and into threaded openings formed in block 44. Screws 46 extend through a pair of spacers 48, which space block 44 interiorly of the inner wall of upper cowl section 12. A mounting bracket 50 is connected to the inner face of block 44 by means of screws 52 engaging bracket 50 and threaded openings formed in block 44. Screws 52 extend through a pair of slots 54 formed in bracket 50, for providing vertical adjustment of bracket 50. A roller 56 is rotatably mounted to the lower end of bracket 50 by means of a pin 58.

FIG. 7 illustrates cowl sections 12, 14 apart from each other, while FIG. 8 illustrates cowl sections 12, 14 moved together into engagement with each other. Referring to FIG. 7, dashed line 60 illustrates the path of movement of the axis of rotation of roller 56 during movement of cowl sections 12, 14 together. As cowl sections 12 and 14 are moved together, roller 56 enters catch slot 38 through entrance 40, engaging wall 39 of slot 28 which guides retainer member 56 through catch slot 38. Roller 56 first travels vertically upon passage through entrance 40, and thereafter is directed forwardly and into engagement with end wall 42 of catch slot 38. When roller 56 is engaged with end wall 42, the material of catch block 30 over the horizontal portion of catch slot 38 engages roller 56 so as to prevent relative vertical movement between cowl sections 12 and 14.

Figure 4:
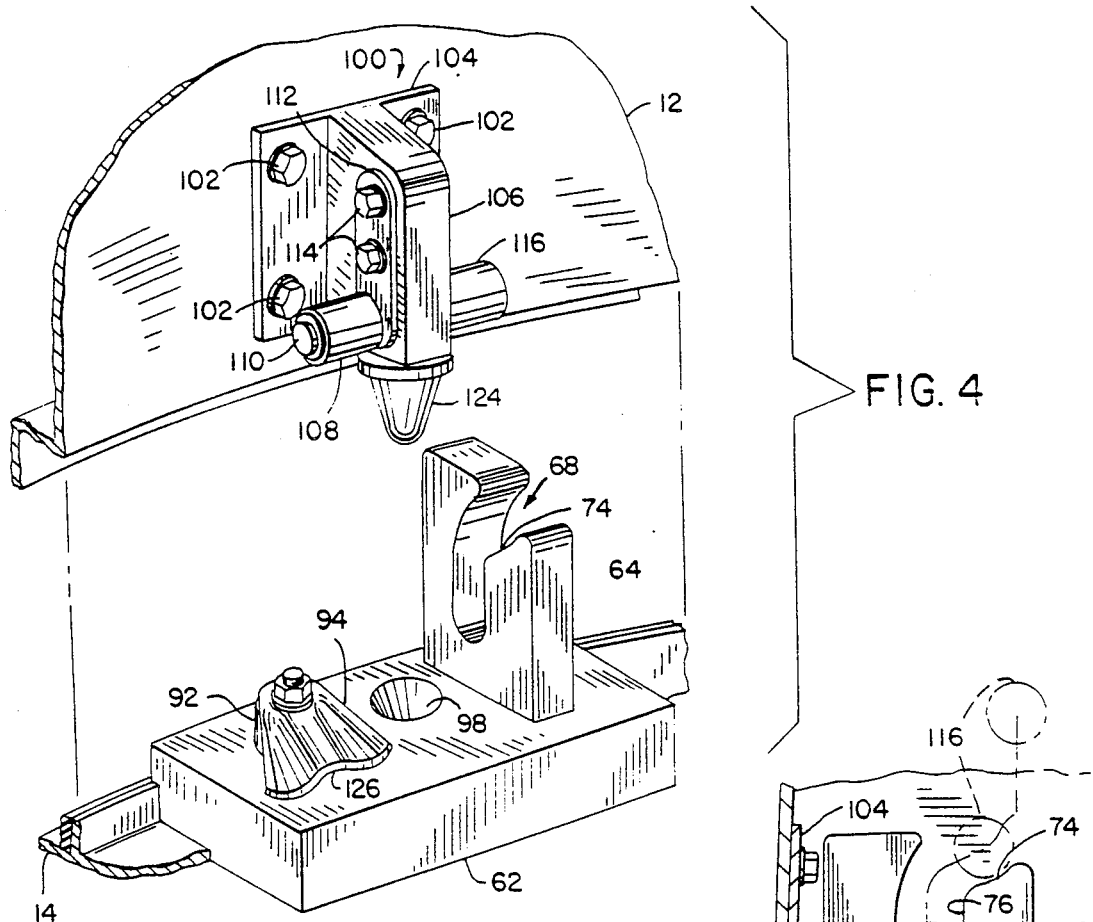
FIG. 4 is a partial exploded isometric view showing the components of the latch assembly mounted to the forward ends of the cowl sections.
Figure 6:
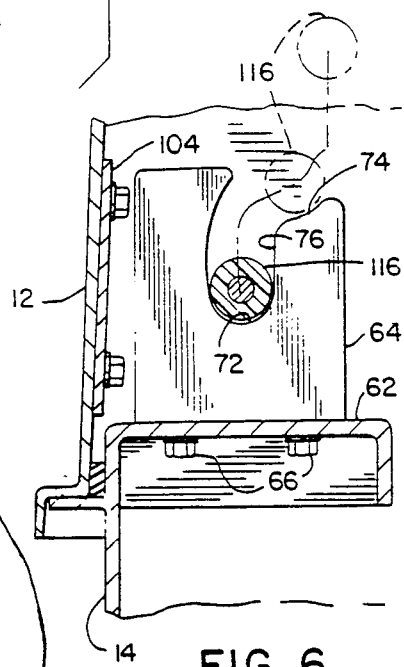
FIG. 6 is an enlarged partial side elevation view showing the cam block located adjacent the latch assembly, reference being made to line 6—6 of FIG. 5.
Figure 5:
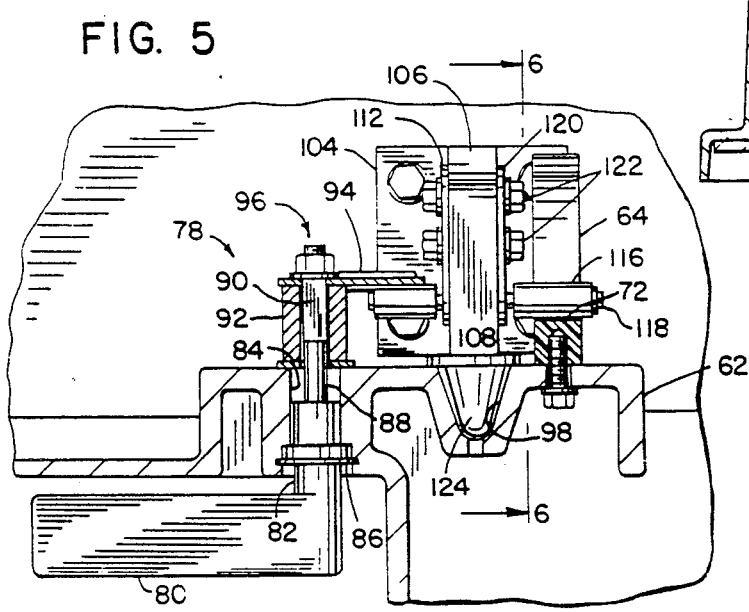
FIG. 5 is a partial sectional view taken generally along 5—5 of FIG. 3.

FIGS. 4–6 illustrate latch assembly 24 in greater detail. As shown, a mounting block 62 is formed integrally with lower cowl section 14, and extends inwardly into the interior of cowl section 14. A cam block 64, preferably formed of a nylon material, is mounted to the upper surface of mounting block 62 by means of a pair of screws 66 extending through openings formed in mounting block 62 and engaging threaded openings formed in the lower portion of cam block 64.

Cam block 64 is provided with a cam slot 68, which defines an entrance, shown generally at 70 (FIG. 6) and terminating in an end wall 72. Cam slot 68 further defines a forwardly facing cam surface including an upper portion 74 and a vertical lower portion 76.

A pivotable latch mechanism 78 is also mounted to mounting block 62. Latch mechanism 78 includes a manually engageable latch handle 80 extending from a vertical post 82, which is pivotably mounted within the lower portion of a vertical passage 84 extending through mounting block 62. A bushing 86 maintains post 82 in position within passage 84, and provides pivoting movement of post 82 relative to lower cowl section 14, and thereby pivoting movement of latch handle 80.

A shaft 88 extends upwardly from post 82, and is pivotable therewith in response to pivoting movement of latch handle 80. Shaft 88 is provided with a noncircular cross section, and engages the walls forming a passage 90 in a cylindrical spacer 92, with the passage in spacer 92 having a non-circular cross section corresponding to and slightly larger than that of shaft 88. With this arrangement, cylindrical spacer 92 is pivotable along with shaft 88. A latch member 94 is mounted to the upper end of cylindrical spacer 92 by means of a nut and bolt assembly 96, such that latch member 94 is pivotable along with spacer 92 in response to pivoting movement of shaft 88 caused by pivoting of latch handle 80. Latch member 94 is pivotable between a locking position and a release position, as will be explained.

The upper surface of mounting block 62 is provided with an upwardly facing substantially conical locating recess, shown generally at 98.

Referring to FIG. 4, a bracket assembly 100 is connected to the inner wall of upper cowl section 12 by means of a series of bolts 102 extending through an end plate 104 associated with bracket assembly 100. A mounting plate 106 extends inwardly from end plate 104 and is mounted thereto. A latch roller 108 is rotatably supported by mounting plate 106 through a pin 110 fixed to a mounting bracket 112, which is secured to the side of mounting plate 106 by means of a pair of bolts 114. In a similar manner, a cam follower 116 is rotatably mounted to the other side of mounting plate 106 by means of a pin 118 fixed to the lower end of a mounting bracket 120, which is connected to the side of mounting plate 106 by means of a pair of bolts 122.

A locating conical projection 124 is connected to the lower surface of mounting plate 106.

In operation, the above-described components function as follows. As upper cowl section 12 is lowered onto lower cowl section 14, cam follower 116 first engages cam surface upper portion 74 formed in cam block 64. The retainer rollers, such as shown at 56 in FIG. 7, are then lowered into the catch slots 38 formed in the catch blocks 30. A dwell position is attained when cam roller 116 rests on the concavely curved surface of cam surface upper portion 74. To further move upper cowl section 12 toward lower cowl section 14, cam follower 116 is moved from upper portion 74 of the cam surface to vertical portion 76. The passage of cam follower 116 between upper portion 74 and vertical portion 76 draws catch rollers 56 forwardly in catch slots 38, and into engagement with the end walls 42 of catch slots 38. Movement of upper cowl section 12 toward lower cowl section 14 continues until cam follower 116 engages end wall 72 of cam slot 70. In this position, cowl sections 12 and 14 are engaged with each other.

During downward movement of cam follower 116 through cam slot 70, locating conical projection 124 mates with and engages conical recess 98 formed in mounting block 62, for providing proper lateral position of upper cowl section 12 on lower cowl section 14

After the cowl sections are moved fully together to the position as shown in FIGS. 5 and 6, latch handle 80 is turned so as to bring latch member 94 into engagement with latch roller 108, which entails movement of latch assembly 98 to its locking position. When latch mechanism 78 is in its locking position, latch roller 108 is disposed within a recess 126 associated with latch member 94, which prevents relative vertical movement between cowl sections 12 and 14.

When latch mechanism 78 is in its locking position, cam follower 116 is maintained in engagement with end wall 72 of cam slot 68. Accordingly, catch rollers 56 are maintained in engagement with end walls 42 of catch slots 38 formed in catch blocks 30. Relative vertical movement at the rear end of the cowl assembly is thus prevented by the material of catch block 30 located over catch slots 38 adjacent slot end walls 42.

With the arrangement as shown and described, a smooth and fluid movement of upper cowl section 12 into engagement with lower cowl section 14 is achieved. The pivoting of latch mechanism 78 about a vertical pivot axis prevents latch mechanism 78 from moving to its release position when the seal between cowl sections 12, 14 is compressed as a result of the lower unit of outboard motor 10 striking a submerged object. In addition, all components of the latching structure are housed within the interior of the cowl assembly, with the exception of the latch handle, so that the latch components do not interfere with the styling of the cowl assembly.

Figure 9:
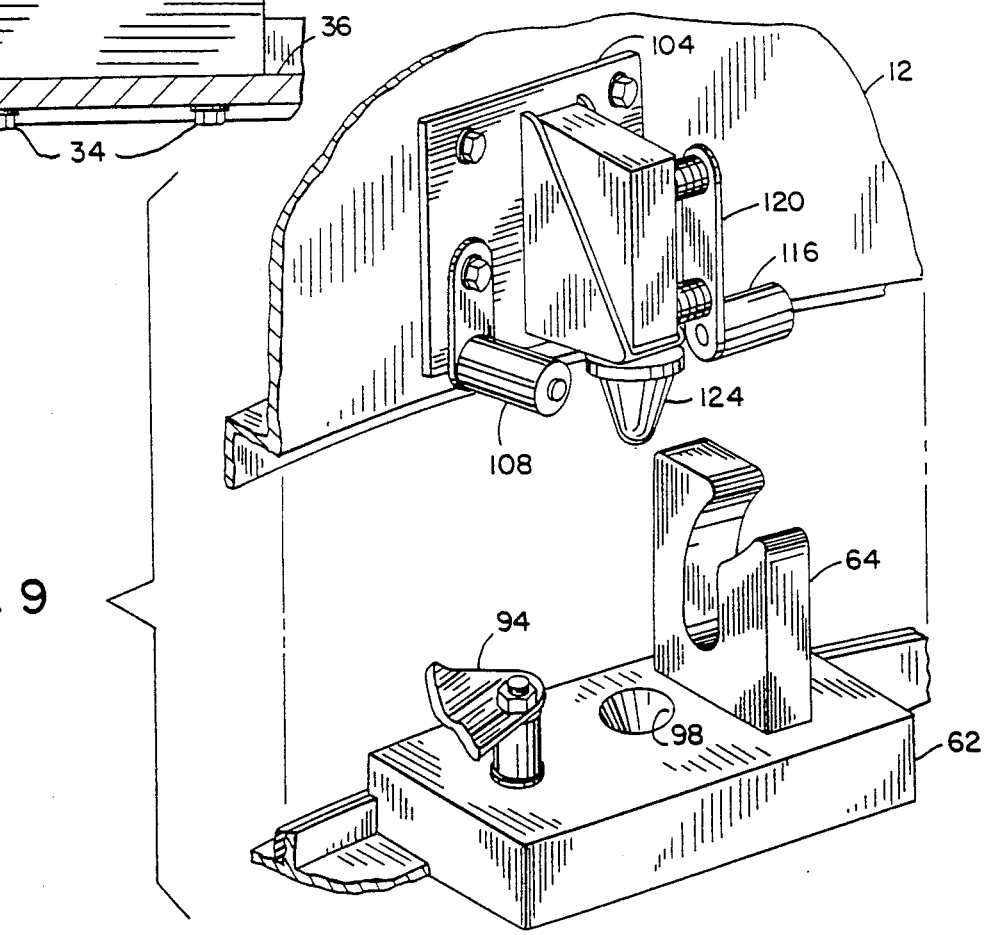
FIG. 9 is a partial exploded isometric view similar to FIG. 4, showing an alternative embodiment of the latch assembly.

FIG. 9 illustrates an alternative embodiment of bracket assembly 100, which is connected to the inner wall of upper cowl section 12. In this embodiment, latch roller 108 is mounted to end plate 104 of bracket assembly 100, and is oriented perpendicular to its orientation as shown in FIG. 4. In addition, bracket 120, to which cam follower 116 is mounted, is spaced outwardly from the side surface of mounting plate 106. Latch mechanism 78 functions in a manner similar to that described above to engage latch roller 108 and to secure cowl sections 12 and 14 together.

Various alternatives and embodiments are contemplated as being within the scope of the following claims particularly pointing out and distinctly claiming the subject regarded as the invention.

We claim:

1. For an outboard marine propulsion device including a power head enclosed within the interior of a cowl assembly including a pair of cowl sections, a latching mechanism for securing the cowl sections together, comprising:

a stationary catch block mounted to a first one of the cowl sections and located within the interior of the cowl assembly, and including a catch slot formed therein;

a retainer member mounted to a second one of the cowl sections and located within the interior of the cowl assembly, the retainer member being received within the catch slot formed in the catch block and engageable with an end of the catch slot; and manually operable latch means interposed between the cowl sections for selectively securing the cowl sections together, the latch means being movable between a locking position and a release position, wherein movement of the latch means to its locking position maintains the retainer member in engagement with the end of the catch slot;

wherein the catch block and latch means are located adjacent opposite ends of the cowl assembly; and wherein the catch slot defines an entrance for receiving the retainer member upon relative vertical movement of the cowl sections together and terminates in an end wall, and wherein the catch slot is formed in the catch block such that the material of the catch block adjacent the end wall engages the retainer member to prevent relative vertical movement between the cowl sections when the retainer member is in engagement with the end wall of the catch slot.

2. The mechanism of claim 1, wherein the retainer member comprises a roller member supported by mounting structure associated with the second cowl section.

3. The mechanism of claim 1, wherein the catch block is mounted to a side of the first cowl section adjacent an end thereof and further comprising a second catch block mounted to the other side of the first cowl section, and including a catch slot formed therein, and further comprising a second retainer member mounted to the second cowl section for engaging the catch slot formed in the second catch block.

4. The mechanism of claim 1, wherein the catch block is mounted to a lower one of the pair of cowl sections and the retainer member is mounted to an upper one of the pair of cowl sections, and wherein the catch slot defines an upwardly facing entrance in the catch block.

5. The mechanism of claim 1, further comprising a cam block mounted to one of the first and second cowl sections adjacent the latch means, and having a cam surface formed therein, and further comprising a cam follower mounted to the other of the first and second cowl sections for engaging the cam surface, wherein movement of the cam follower along the cam surface provides relative horizontal movement between the cowl sections to draw the retainer member horizontally within the catch slot and into engagement with the end of the catch slot as the cowl sections are moved together.

6. The mechanism of claim 5, wherein the cam surface is defined by a cam slot formed in the cam block, the cam slot including a vertical portion terminating in an end wall with which the cam follower is engageable, and wherein the latch means in its locking position maintains the cam follower in engagement with the end wall of the cam slot, to thereby maintain the retainer member in engagement with the end of the catch slot.

7. The mechanism of claim 6, wherein the latch means comprises a pivotable latch handle mounted to the first cowl section, a movable latch member mounted to the latch handle and pivotably movable therewith, and a horizontally oriented stationary latch member mounted to the second cowl section for engagement by the movable latch member.

8. The mechanism of claim 7, wherein the cam follower and the stationary latch member are mounted to a bracket member mounted to an inner wall of the second cowl section.

9. The mechanism of claim 5, further comprising a vertical recess formed on one of the first and second cowl sections at the same end of the cowl assembly as the latch means, and a vertical projection provided on the other of the first and second cowl sections for mating with the vertical recess to insure proper lateral positioning of the cowl sections relative to each other.

10. The mechanism of claim 9, wherein the cam block and catch block are mounted to a support member connected to the first cowl section and extending into the interior of the cowl assembly, and wherein the vertical recess is formed in the support member.

11. The mechanism of claim 9, wherein the latch means includes a stationary latch member mounted to a bracket member connected to the same cowl section as the cam follower, and wherein the vertical projection, the stationary latch member, and the cam follower are mounted to the bracket member.

12. For an outboard marine propulsion device including a powerhead enclosed within the interior of a cowl assembly including a pair of cowl sections, a latching mechanism for securing the cowl sections together, comprising:

a catch system interposed between the cowl sections adjacent one end of the cowl assembly and including a catch slot associated with one of the cowl sections and a retainer member associated with the other of the cowl sections and engageable with the catch slot, wherein the catch slot includes an end wall against which the retainer member is located when the cowl sections are secured together, and wherein relative vertical movement between the cowl sections is prevented when the retainer member is engaged with the end wall of the catch slot; and a latch system interposed between the cowl sections adjacent the other end of the cowl assembly, the latch system being movable between a locking position and a release position, wherein the latch system in its locking position maintains the retainer member against the end wall of the catch slot and prevents relative vertical and horizontal movement between the cowl sections;

wherein the catch slot provides a vertically facing entrance for receiving the retainer member therein, and a horizontal portion adjacent the end wall for preventing vertical movement of the retainer member when the retainer member is maintained against the end wall.

13. The mechanism of claim 12, wherein the catch system includes a pair of catch blocks with a catch slot formed in each catch block, wherein the catch blocks are located one on either side of one of the cowl sections.

14. The mechanism of claim 12, further comprising an angled cam surface provided on a first one of the cowl sections and located adjacent the same end of the cowl assembly as the latch system, and a cam follower provided on a second one of the cowl sections and engageable with the cam surface, wherein movement of the cam follower along the angled cam surface as the cowl sections are moved toward teach other acts to draw the retainer member into and through the horizontal portion of the catch slot and against the end wall of the catch slot.

15. The mechanism of claim 14, wherein the angled cam surface is formed on a cam block mounted to the first cowl section.

16. The mechanism of claim 15, wherein the cam block further defines a vertical surface against which the cam follower moves as the cowl sections are moved toward each other after the cam follower disengages the angles cam surface, wherein the cam block defines an end wall at the end of the vertical surface and against which the cam follower bears when the cowl sections are moved into engagement with each other.

17. The mechanism of claim 16, wherein the latch system maintains the cam follower in engagement with the end wall to prevent disengagement of the retainer member from the catch slot.

18. The mechanism of claim 12, wherein the latch system includes a vertical recess formed in a first one of the cowl sections and a mating vertical projection provided on a second one of the cowl sections.

19. The mechanism of claim 18, wherein the latch system further comprises a horizontal stationary latch member provided on one of the first and second cowl sections, and a movable latch member provided on the other of the first and second cowl sections and engageable with the stationary latch member when the latch system is in its locking position, to maintain the vertical projection in mating engagement with the vertical recess.

20. A cowl assembly for enclosing the powerhead of an outboard motor, comprising:
   a lower stationary cowl section;
   an upper removable cowl section;
   a catch block mounted to a first one of the cowl sections and having a catch slot formed therein, the catch slot defining an entrance and a non-vertical portion extending along a non-vertical axis;
   a retainer member mounted to a second one of the cowl sections, the retainer member being received within the catch slot entrance during movement of the upper cowl section toward the lower cowl section, and being positioned with in the non-vertical portion of the catch slot when the upper cowl section is engaged with the lower cowl section, such that the material of the catch block n vertical alignment with the non-vertical portion of the catch slot is located vertically adjacent and above the retainer member; and
   manually operable latch means interposed between the upper and lower cowl sections and movable between a locking position and a release position, wherein the latch means in its locking position maintains the retainer member within the non-vertical portion of the catch slot, and wherein the material of the catch block located above the retainer member acts to prevent vertical upward movement of the upper cowl section.

21. The assembly of claim 20, wherein the catch slot entrance provides vertical entry of the retainer member into the catch slot.

22. The assembly of claim 20, wherein the non-vertical portion of the catch slot extends substantially horizontally.

23. The assembly of claim 20, wherein the non-vertical portion of the catch slot terminates in an end wall, and wherein the retainer member is located against the end wall when the upper and lower cowl sections are secured together.

24. The assembly of claim 20, wherein the catch block and retainer member are located toward an end of the first and second cowl sections, respectively, and further comprising a guide arrangement interposed between the cowl sections toward the opposite end of the cowl sections for drawing the retainer member into the non-vertical portion of the catch slot.

25. The assembly of claim 24, wherein the guide arrangement comprises a cam surface provided on one of the upper and lower cowl sections, and a cam follower provided on the other of the upper and lower cowl sections and engageable with the cam surface.

* * * * *